(12) United States Patent
Ting et al.

(10) Patent No.: US 9,005,687 B2
(45) Date of Patent: Apr. 14, 2015

(54) METHODS FOR REDUCING SOLUBLE METAL IONS IN DIATOMACEOUS EARTH FILTER AIDS

(75) Inventors: Patrick L. Ting, Brookfield, WI (US); Fran L. Saunders, Whitefish Bay, WI (US); Rhonda M. Dannenberg, Port Washington, WI (US); Jacqueline A. Laumann, Wales, WI (US); John T. Eplett, III, Wauwatosa, WI (US); Gregory P. Casey, Littleton, CO (US); David S. Ryder, Mequon, WI (US)

(73) Assignee: MillerCoors LLC, Wilmington, DE (US)

( * ) Notice: Subject to any disclaimer, the term of this patent is extended or adjusted under 35 U.S.C. 154(b) by 509 days.

(21) Appl. No.: 12/724,173

(22) Filed: Mar. 15, 2010

(65) Prior Publication Data

US 2011/0223301 A1    Sep. 15, 2011

(51) Int. Cl.
*A23L 2/00* (2006.01)
*C12H 1/04* (2006.01)
(Continued)

(52) U.S. Cl.
CPC ............... *B01J 20/14* (2013.01); *B01D 39/06* (2013.01); *C12H 1/0408* (2013.01)

(58) Field of Classification Search
CPC .......... C12H 1/408; B01J 20/14; B01D 39/06
USPC ........... 426/29, 423, 600, 330.4, 16, 12, 592, 426/26
See application file for complete search history.

(56) References Cited

U.S. PATENT DOCUMENTS

| 665,652 A | 1/1901 | Enzinger |
| 1,992,547 A | 5/1932 | Schuetz et al. |

(Continued)

FOREIGN PATENT DOCUMENTS

| DE | 1468683 | 3/1977 |
| JP | 11-554 | 6/1999 |

(Continued)

OTHER PUBLICATIONS

Briggs, et al., "Brewing Science and Practice" Woodhead Publishing Limited and CRC Press LLC (2004).*

(Continued)

*Primary Examiner* — Rena L Dye
*Assistant Examiner* — Assaf Zilbering
(74) *Attorney, Agent, or Firm* — Quarles & Brady LLP

(57) ABSTRACT

A method for reducing the amount of beverage soluble metal ions in a diatomaceous earth filter aid is disclosed. The beverage soluble metal ions can be copper and/or iron. In the method, the diatomaceous earth filter aid is contacted with a hop compound selected from iso-alpha-acids, dihydroiso-alpha-acids, tetrahydroiso-alpha-acids, hexahydroiso-alpha-acids, alpha-acids, and beta-acids. The diatomaceous earth filter aid can also be contacted with and an acid other than the hop compound such as phosphoric acid. The iso-alpha-acids, dihydroiso-alpha-acids, tetrahydroiso-alpha-acids, hexahydroiso-alpha-acids, alpha-acids, or beta-acids bind the copper and iron metal ions and/or change the form of copper and iron in diatomaceous earth so the copper and iron are rendered substantially insoluble in a beverage such as beer. A method for filtering a beverage using the treated diatomaceous earth filter aid is also disclosed. A method for increasing the flavor stability of a malt beverage filtered with a diatomaceous earth filter aid is also disclosed.

22 Claims, 7 Drawing Sheets

(51) Int. Cl.

| | |
|---|---|
| *C12C 3/00* | (2006.01) |
| *C12H 1/00* | (2006.01) |
| *C12C 11/00* | (2006.01) |
| *C12G 1/00* | (2006.01) |
| *C12H 1/14* | (2006.01) |
| *B01J 20/14* | (2006.01) |
| *B01D 39/06* | (2006.01) |
| *C12H 1/044* | (2006.01) |

(56) References Cited

U.S. PATENT DOCUMENTS

| | | |
|---|---|---|
| 2,701,240 A | 2/1955 | Bregar |
| 4,134,857 A | 1/1979 | Bradley et al. |
| 4,142,968 A | 3/1979 | Nielsen et al. |
| 4,187,174 A | 2/1980 | Nielsen et al. |
| 4,201,670 A | 5/1980 | Baur |
| 4,202,910 A | 5/1980 | Bradley et al. |
| 4,965,084 A | 10/1990 | Austin et al. |
| 5,009,906 A | 4/1991 | Smith |
| 5,478,580 A | 12/1995 | Foster, II |
| 5,767,319 A | 6/1998 | Ting et al. |
| 6,020,019 A | 2/2000 | Ting et al. |
| 6,589,430 B1 | 7/2003 | Pecar et al. |
| 2001/0023233 A1 | 9/2001 | Shiuh et al. |
| 2003/0170361 A1 | 9/2003 | Hu et al. |
| 2009/0264287 A1 | 10/2009 | Wang et al. |

FOREIGN PATENT DOCUMENTS

| | | |
|---|---|---|
| WO | 00/66705 | 11/2000 |
| WO | 2008024952 | 2/2008 |

OTHER PUBLICATIONS

"Beer Filtration—Powder Filter Aids". Available online at www.beer-brewing.com on Oct. 23, 2008.*
Hughes and Baxter "Beer Quality, Safety and Nutritinoal Aspects". Royal Society of Chemistry (2001) pp. 14-39.*
Divergan HM—Polymer for Heavy Metal Reduction—BASF pamphlet.
Abstract for JP 11-554.

* cited by examiner

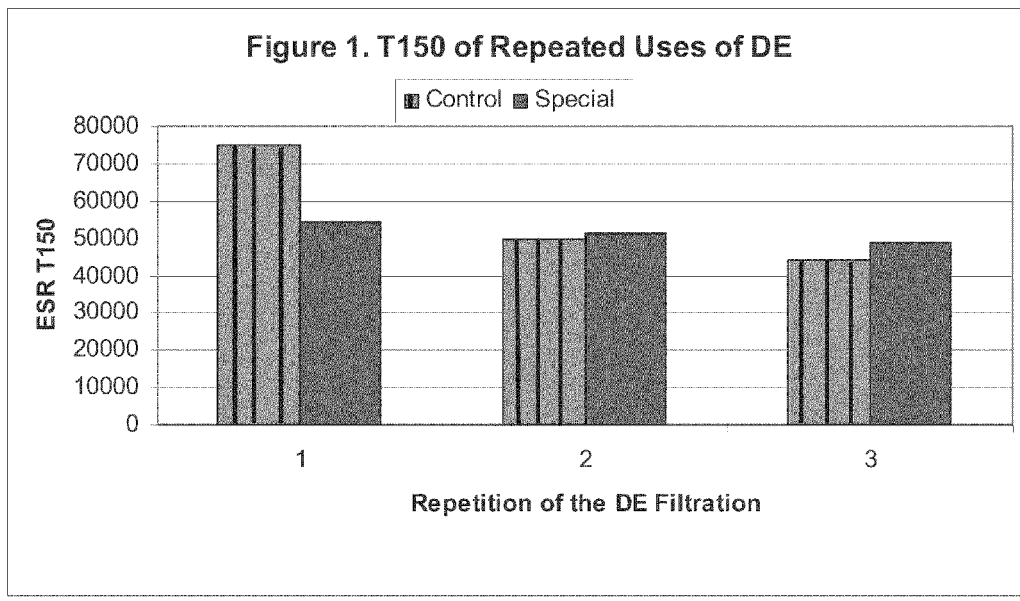

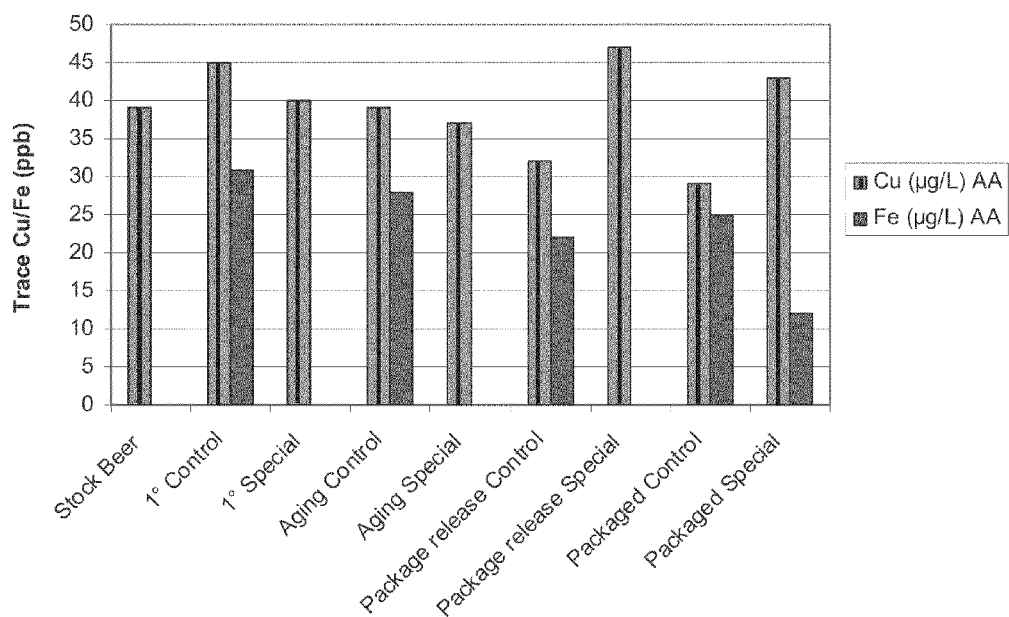

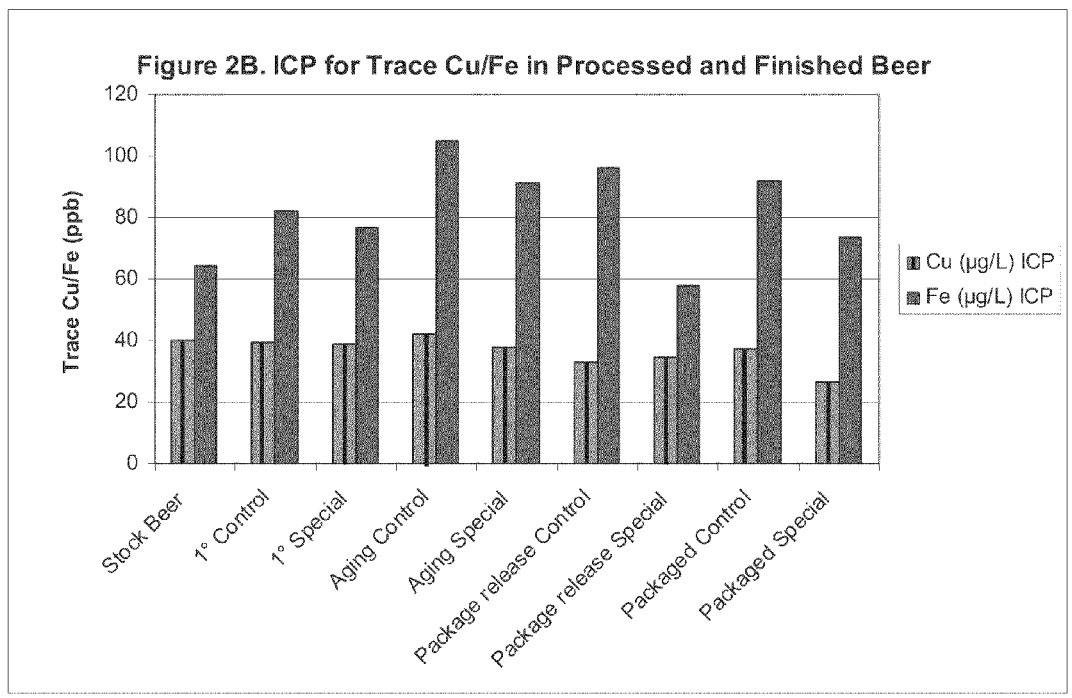

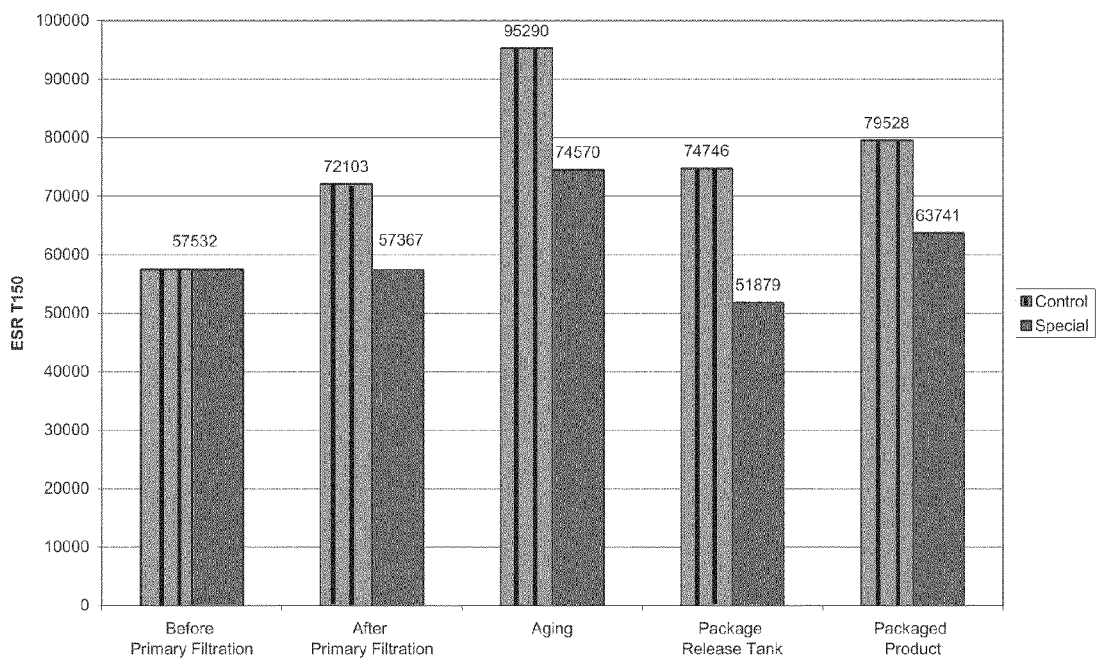
Figure 3. MVB Trial - THSO/H$_3$PO$_4$ Treated DE vs. Untreated DE

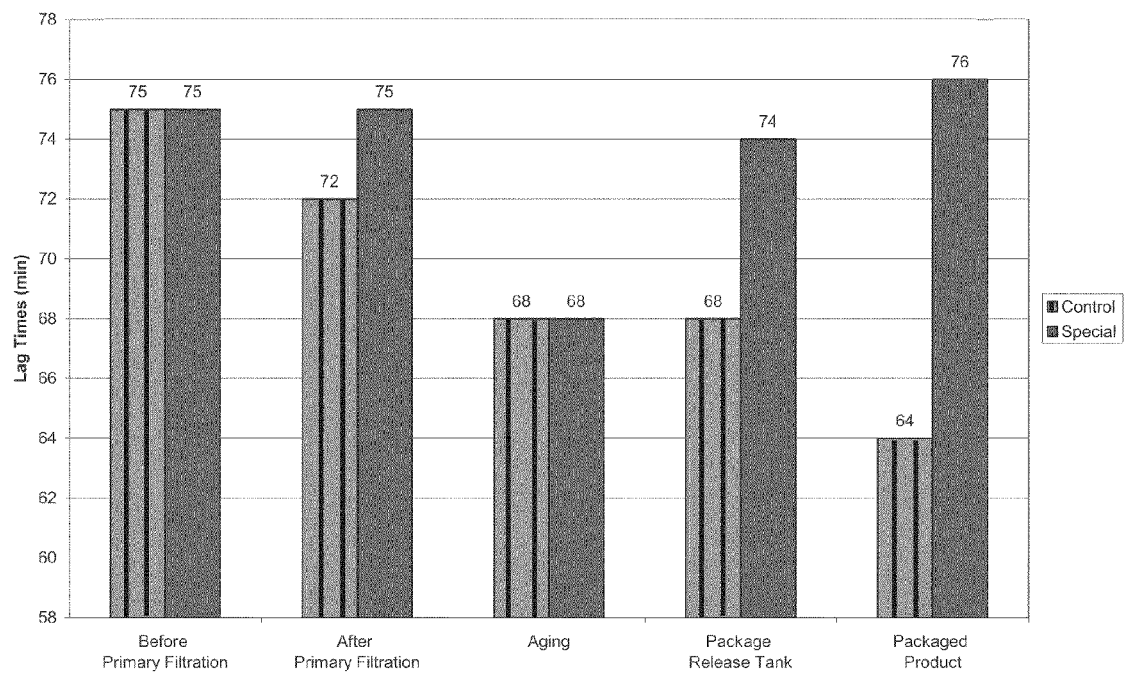
Figure 4. MVB Trial - THISO/H$_3$PO$_4$ Treated DE vs. Untreated DE

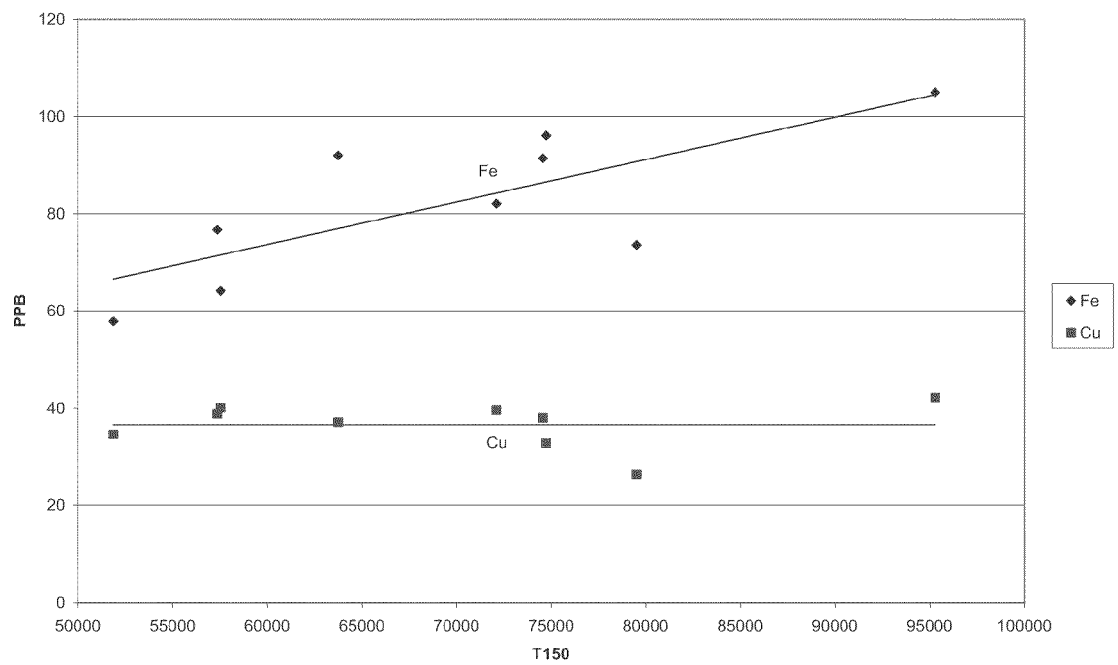

METHODS FOR REDUCING SOLUBLE METAL IONS IN DIATOMACEOUS EARTH FILTER AIDS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

This invention relates to a method for reducing the amount of beverage soluble metal ions in a diatomaceous earth filter aid, a method for filtering a beverage using the treated diatomaceous earth filter aid, and a method for increasing the flavor stability of a malt beverage filtered with a diatomaceous earth filter aid.

2. Description of the Related Art

Filtration using diatomaceous earth as a filtration aid has been used by brewers around the world for many years to produce brilliantly clear beer. Diatomaceous earth is a very light weight powder with high porosity and its chemical composition consists of 86% silicon, 5% sodium, 3% magnesium, 2% iron, and many other minor metals. The porous structure of diatomaceous earth is particularly effective in entrapping suspended particles. Diatomaceous earth can also be called kieselguhr.

In a common beer filtering process, a filter element is pre-coated with a mixture of diatomaceous earth and diluent (e.g., deaerated water) prior to the filtration. Another portion of the diatomaceous earth mixture (body feed) is added directly into the beer stream being filtered. It usually requires two filtrations (primary and final) to achieve beer clarity.

The "cardboard" like flavor that occurs in stale beer is thought to arise from free radical mediated oxidation of various constituents in beer. The characteristic odor and taste are believed to be caused by decomposition products from the free radical process. It is reported that these off-flavor products can be detected by the consumer in beer even at very low concentrations. Diatomaceous earth filtration can be a major liability for beer flavor stability because some of the iron, copper and other metals from the diatomaceous earth leach into the beer being filtered such that trace amounts of iron or copper and trace levels of oxygen mediate free radical formation resulting in decreased flavor stability of the beer.

Because iron (typically as the ions $Fe^{2+}$ and/or $Fe^{3+}$) can decrease flavor stability of the beer, the contents of iron in the diatomaceous earth which are soluble in beer (e.g., beer soluble iron) provide useful indicators of the degree to which release of iron occurs. It has been reported that the majority of conventional diatomite filter aids used in beer filtration have beer soluble iron contents from approximately 7 mg Fe/kg product to approximately 50 mg Fe/kg product. A reliable analytical method has been established in the industry to determine the solubility of iron from diatomite products in beer (American Society of Brewing Chemists, 1987).

Accordingly, processes have been developed which seek to reduce the beverage soluble iron content of diatomaceous earth filter aids. For example, U.S. Pat. No. 665,652 describes heating diatomaceous earth in a solution of hydrochloric acid and nitric acid. U.S. Pat. No. 1,992,547 describes contacting diatomaceous earth with hydrochloric acid, sulfuric acid, or phosphoric acid. U.S. Pat. No. 2,701,240 describes contacting diatomaceous earth with oxy-acids of phosphorous. U.S. Pat. No. 4,134,857 describes contacting diatomaceous earth with tannic acid or gallic acid. U.S. Pat. Nos. 4,142,968 and 4,187,174 disclose a method in which diatomaceous earth filter aids are treated with sulfuric acid, hydrochloric acid, nitric acid, acetic acid, or oxalic acid. In this method, the filter aids are maintained in contact with a relatively small volume of an acid for a period of days, resulting in a beer soluble iron content of less than 100-50 ppm. U.S. Patent Application Publication No. 2001/0023233 discloses the washing of diatomite products with a mineral acid (such as sulfuric acid, hydrochloric acid, phosphoric acid, or nitric acid), or an organic acid (such as citric acid or acetic acid). However, in a full-scale brewery, the preparation of acid-washed diatomaceous earth creates extra work and waste water, including washing diatomaceous earth, filtering and disposing of the acidic wash solution, and re-suspending the diatomaceous earth.

U.S. Pat. No. 4,965,084 describes another method in which the beer soluble iron content of a diatomaceous earth material is reduced by contacting the diatomaceous earth with a polydentate ligand. U.S. Pat. No. 5,099,906 describes the treatment of diatomaceous earth filter aids with an alkali metal silicate to reduce multivalent metal cations. U.S. Patent Application Publication No. 2009/0264287 (also WO 2008/024952) discloses an alternative method in which the beer soluble iron content of a diatomaceous earth material is reduced by subjecting the diatomaceous earth feed material to a saturated steam treatment. These methods require a pre-cleaning procedure including separation of soluble iron or other metal ions from diatomaceous earth prior to use as a filter aid, resulting in additional operational and equipment costs.

Brewers and brewing scientists around the world are looking at alternative technologies to replace diatomaceous earth filtration. One proposed method for filtering beer uses a polymer for heavy metal reduction. For example, Divergan® HM, a crosslinked copolymer consisting of vinylimidazole and vinylpyrrolidone available from BASF Corporation, Mount Olive, N.J., USA, has been developed for heavy metal reduction. Membranes have also been considered for beer filtration. One stumbling block is the cost of these alternative filtration technologies.

Therefore, there still exists a need for an improved method for preventing soluble iron, soluble copper, and other soluble cations in diatomaceous earth filter aids from being transferred into filtered beer.

SUMMARY OF THE INVENTION

The present invention provides a method of preventing soluble metal cations, such as copper and iron, in diatomaceous earth filter aids from passing into beer during filtration leading to an improvement of the flavor stability of the finished product. Diatomaceous earth contains significant copper and iron in various forms, of which one or more may be soluble in beer being filtered. The soluble copper and iron can have a deleterious effect on the flavor stability or shelf-life of beer. The reduction of beer soluble copper and iron in diatomaceous earth filter aids can prolong the shelf life and improve the flavor stability of fermented malt beverages.

In one version of the invention, a diatomaceous earth filter aid is treated with a hop compound selected from iso-alpha-acids, dihydroiso-alpha-acids, tetrahydroiso-alpha-acids, hexahydroiso-alpha-acids, alpha-acids, or beta-acids (all brewing ingredients), and an acid other than the hop compound. In one example version of the invention, we discovered that tetrahydroiso-alpha-acids bind the copper and iron metal ions and/or changes the form of copper and iron in diatomaceous earth so the copper and iron is rendered substantially insoluble in beer. In another example version of the invention, we use both phosphoric acid and tetrahydroiso-alpha-acids such that the phosphoric acid facilitates releasing and chelating copper and iron with tetrahydroiso-alpha-acids and confines the copper and iron on the diatomaceous earth matrix. As a result, there is no increase in copper and iron ions after both primary and final filtration, leading to improved flavor stability and/or longer shelf-life of beer.

In one aspect, the invention provides a method for reducing the amount of beverage soluble metal ions in a diatomaceous earth filter aid. The beverage soluble metal ions can be copper, iron and mixtures thereof. In the method, the diatomaceous earth filter aid is contacted with a hop compound selected from iso-alpha-acids, dihydroiso-alpha-acids, tetrahydroiso-alpha-acids, hexahydroiso-alpha-acids, alpha-acids, and beta-acids. The diatomaceous earth filter aid can be dispersed in a slurry, and the hop compound can be added to the slurry at 0.1 to 20 percent by weight of the diatomaceous earth in the slurry. The slurry can include an acid other than the hop compound. The acid can be selected from phosphoric acid, sulfuric acid, hydrochloric acid, nitric acid, tartaric acid, lactic acid, tannic acid, acetic acid, oxalic acid, citric acid, and mixtures thereof. Preferably, the hop compound is selected from tetrahydroiso-alpha-acids, and the acid is phosphoric acid. The slurry can include the phosphoric acid at 0.1 to 20 percent by weight of the diatomaceous earth in the slurry. The slurry can include the diatomaceous earth at 1 to 20 percent by weight of the slurry.

In another aspect, the invention provides a method for filtering a beverage. The beverage can be a malt beverage. In the method, a filter element is contacted with a precoat slurry including diatomaceous earth and a hop compound selected from iso-alpha-acids, dihydroiso-alpha-acids, tetrahydroiso-alpha-acids, hexahydroiso-alpha-acids, alpha-acids, and beta-acids thereby depositing a layer of diatomaceous earth on the filter element. The beverage is then passed through the layer of diatomaceous earth on the filter element. The hop compound can be included in the precoat slurry at 0.1 to 20 percent by weight of the diatomaceous earth in the precoat slurry.

The precoat slurry can include an acid other than the hop compound. The acid can be selected from the group consisting of phosphoric acid, sulfuric acid, hydrochloric acid, nitric acid, tartaric acid, lactic acid, tannic acid, acetic acid, oxalic acid, citric acid, and mixtures thereof. Preferably, the hop compound is selected from tetrahydroiso-alpha-acids, and the acid is phosphoric acid.

The precoat slurry can include the hop compound at 0.1 to 20 percent by weight of the diatomaceous earth in the precoat slurry, and the precoat slurry can include the phosphoric acid at 0.1 to 20 percent by weight of the diatomaceous earth in the precoat slurry. The precoat slurry can include the diatomaceous earth at 1 to 20 percent by weight of the precoat slurry.

In one version of this aspect of the invention, a second slurry is added to the beverage before passing the beverage through the layer of diatomaceous earth on the filter element. The second slurry can include diatomaceous earth and a hop compound selected from iso-alpha-acids, dihydroiso-alpha-acids, tetrahydroiso-alpha-acids, hexahydroiso-alpha-acids, alpha-acids, and beta-acids. The diatomaceous earth in the precoat slurry can have a first average particle size, and the diatomaceous earth in the second slurry can have a second average particle size smaller than the first average particle size. The hop compound can be included in the second slurry at 0.1 to 10 percent by weight of the diatomaceous earth in the second slurry.

In yet another aspect, the invention provides a method for increasing the flavor stability of a malt beverage wherein the malt beverage is filtered with a diatomaceous earth filter aid. In the method, the diatomaceous earth filter aid is contacted with a hop compound selected from iso-alpha-acids, dihydroiso-alpha-acids, tetrahydroiso-alpha-acids, hexahydroiso-alpha-acids, alpha-acids, and beta-acids thereby preventing release of at least some beverage soluble metal ions into the beverage. The diatomaceous earth filter aid can be contacted with the hop compound in a slurry of the diatomaceous earth filter aid. The diatomaceous earth filter aid can be contacted with the hop compound and an acid other than the hop compound in a slurry of the diatomaceous earth filter aid. Preferably, the hop compound is selected from tetrahydroiso-alpha-acids, and the acid is phosphoric acid. The slurry can include the hop compound at 0.1 to 20 percent by weight of the diatomaceous earth in the slurry, and the slurry can include the phosphoric acid at 0.1 to 20 percent by weight of the diatomaceous earth in the slurry.

It is therefore an advantage of the invention to provide a method for filtering a beverage using a treated diatomaceous earth filter aid in which no diatomaceous earth pre-cleaning and separation procedures are needed.

It is another advantage of the invention to provide a method for filtering a beverage using a treated diatomaceous earth filter aid where the method uses brewing ingredients and can be operated on-site without extra operation and equipment.

It is yet another advantage of the invention to provide a method for filtering a beverage using a treated diatomaceous earth filter aid where the method is applicable for non-alcoholic beverage, malt beverage, wine making, and distilled spirits industries that concern flavor stability or shelf life due to metal ions (e.g., copper and iron) leaching during diatomaceous earth filtration.

These and other features, aspects, and advantages of the present invention will become better understood upon consideration of the following detailed description, drawings and appended claims.

BRIEF DESCRIPTION OF THE DRAWINGS

FIG. 1 depicts electron spin resonance measurements of free radical intensity during an accelerated auto-oxidation for 150 minutes (T150) for filtered beer after repeated uses of treated (special) or untreated (control) diatomaceous earth.

FIG. 2A depicts distributions of trace Cu/Fe (ppb) vs. various stages of beer samples by atomic absorption (AA).

FIG. 2B depicts distributions of trace Cu/Fe (ppb) vs. various stages of beer samples by inductively coupled plasma (ICP).

FIG. 3 depicts electron spin resonance measurements of free radical intensity during an accelerated auto-oxidation for 150 minutes (T150) for beer samples at various stages of production in a trial (labeled MVB).

FIG. 4 depicts electron spin resonance lag time measurements for beer samples at various stages of production in a trial (labeled MVB).

FIG. 5 is a plot of trace Cu and Fe contents against T150 values of a control beer showing a relationship between T150 and Fe.

DETAILED DESCRIPTION OF THE INVENTION

Figure 6:
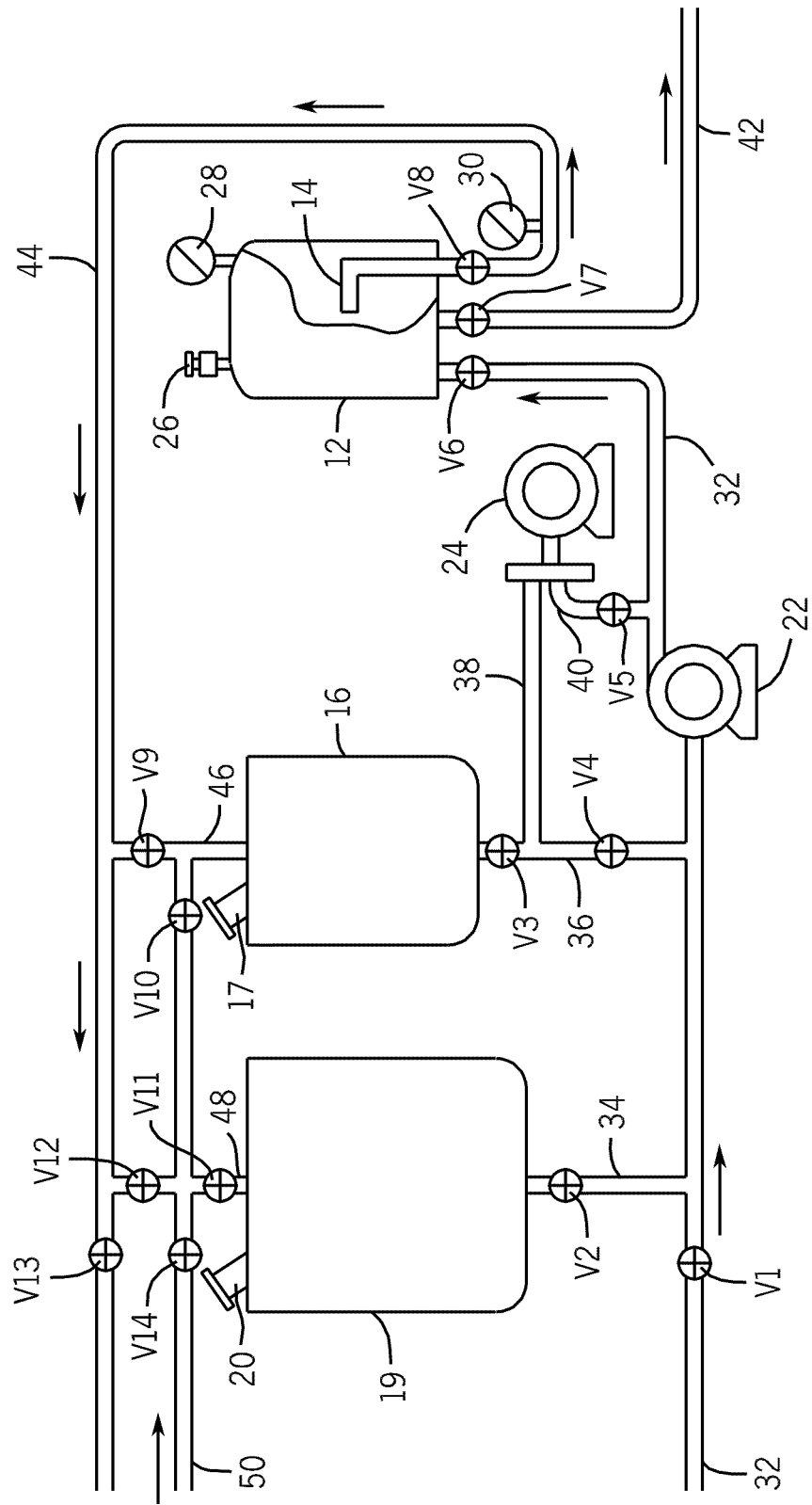
FIG. 6 is a schematic showing an example brewery diatomaceous earth filtration system.

The invention relates to a method for reducing the amount of beverage soluble metal ions in a diatomaceous earth filter aid, and a method for filtering a beverage using the treated diatomaceous earth filter aid, and a method for increasing the flavor stability of a malt beverage filtered with a diatomaceous earth filter aid.

FIG. 6 shows an example brewery diatomaceous earth filtration system 10. The system 10 includes a filter tank 12 including one or more filter screens 14, a body feed tank 16 having an agitator 17, a precoat tank 19 having an agitator 20, a filter feed pump 22, and a body feed pump 24. The filter tank 12 includes a vent 26, an upstream pressure gauge 28, and a downstream pressure gauge 30.

The system 10 includes fluid flow conduits for directing fluid within the system 10. A filter feed conduit 32 supplies beer to be filtered to the system 10. The filter feed conduit 32 is in fluid communication with the filter tank 12. A precoat outlet conduit 34 is in fluid communication with the precoat tank 19 and the filter feed conduit 32. A body feed outlet conduit 36 is in fluid communication with the body feed tank 16 and the filter feed conduit 32. The body feed outlet conduit 36 is also in fluid communication with a body feed pump inlet conduit 38 that is in fluid communication with the body feed pump 24. A body feed pump outlet conduit 40 is in fluid communication with the filter feed conduit 32. A drain conduit 42 is in fluid communication with the filter tank 12 and a drain (not shown).

A filtrate conduit 44 is in fluid communication with the filter tank 12 and a storage tank (not shown) for storing the filtered beer. A body feed inlet conduit 46 is in fluid communication with the body feed tank 16. A precoat inlet conduit 48 is in fluid communication with the precoat tank 19. A clear liquid inlet conduit 50 provides clear liquid to the system 10. The clear liquid inlet conduit 50 is in fluid communication with the body feed inlet conduit 46 and the precoat inlet conduit 48. Suitable controllable valves V1 to V14 are provided in the system 10 to control fluid flow in the conduits.

In the example brewery diatomaceous earth filtration system 10 as shown in FIG. 6, diatomaceous earth is mixed in the precoat tank 19 with diluent or deaerated water supplied from the clear liquid inlet conduit 50 and the precoat inlet conduit 48 to the precoat tank 19. In a pre-coat operation, the diatomaceous earth mixture is recirculated to coat filter screen(s) 14 inside the filter tank 12. Diatomaceous earth is mixed in the body feed tank 16 with diluent or deaerated water supplied from the clear liquid inlet conduit 50 and the body feed inlet conduit 46 to the body feed tank 16. A diatomaceous earth slurry (diatomaceous earth+diluent) from body feed tank 16 is dosed as body feed into beer travelling from the filter feed conduit 32 to the filter tank 12. The filter screen(s) 14 are usually pre-coated with a coarse-grade diatomaceous earth, and a finer-grade diatomaceous earth is used in the body feed. The filter screen(s) 14 can have apertures of about 50 μm before precoating. During filtration, the finer-grade diatomaceous earth of the body feed settles on the precoat layer of coarse-grade diatomaceous earth on the filter screen(s) 14. Beer moves through the filter screen(s) 14 where solids such as yeast and haze are removed. Variations of the filtration system 10 are possible. For example, the filter screen(s) 14 can be vertical leaf, horizontal leaf, or candle filters. This filtration system 10 can remove beer suspended solids down to a size of about 1 μm.

Filtered beer exits the filter tank 12 and passes through the filtrate conduit 44 to a storage tank. The operator of the system 10 can monitor the upstream pressure gauge 28 and the downstream pressure gauge 30 to determine the pressure drop across the filter screen(s) 14. Smaller pressure drops can indicate that the filter screen and the filter aid are too porous, and larger pressure drops can indicate that the filter screen and the filter aid are not sufficiently porous.

In one embodiment of the invention, there is provided a method for filtering a beverage that can use a filtration system such as diatomaceous earth filtration system 10. Other filtration systems can also be used. In an example method of the invention, a filter element, such as filter screen 14, is contacted with a precoat slurry including diatomaceous earth and a hop compound selected from iso-alpha-acids, dihydroiso-alpha-acids, tetrahydroiso-alpha-acids, hexahydroiso-alpha-acids, alpha-acids, and beta-acids thereby depositing a layer of diatomaceous earth on the filter element. The filter element can reside in a filter tank, such as filter tank 12.

In example versions of the invention, the diatomaceous earth is included in the precoat slurry at 1 to 20 percent by weight of the precoat slurry, or at 5 to 15 percent by weight of the precoat slurry, or at 8 to 13 percent by weight of the precoat slurry.

In example versions of the invention, the hop compound is included in the precoat slurry at 0.1 to 20 percent by weight of the diatomaceous earth in the precoat slurry, or at 0.1 to 10 percent by weight of the diatomaceous earth in the precoat slurry, or at 0.1 to 5 percent by weight of the diatomaceous earth in the precoat slurry, or at 0.1 to 2 percent by weight of the diatomaceous earth in the precoat slurry, or at 0.1 to 1 percent by weight of the diatomaceous earth in the precoat slurry.

The precoat slurry preferably includes another acid other than the hop compound. Non-limiting examples of the acid include phosphoric acid, sulfuric acid, hydrochloric acid, nitric acid, tartaric acid, lactic acid, tannic acid, acetic acid, oxalic acid, citric acid, and mixtures thereof. In example versions of the invention, the acid other than the hop compound is included in the precoat slurry at 0.1 to 20 percent by weight of the diatomaceous earth in the precoat slurry, or at 0.5 to 15 percent by weight of the diatomaceous earth in the precoat slurry, or at 1 to 10 percent by weight of the diatomaceous earth in the precoat slurry.

After a layer of diatomaceous earth is deposited on the filter element, the beverage being filtered is passed through the layer of diatomaceous earth on the filter element and into a storage tank.

In one embodiment of the invention, a second diatomaceous earth slurry is dosed as body feed into fluid travelling from the body feed tank 16 to the filter tank 12 having the filter element before the beverage passes through the layer of diatomaceous earth on the filter element. Preferably, the diatomaceous earth in the second body feed slurry has a second average particle size smaller than the first average particle size of the diatomaceous earth in the precoat slurry.

In example versions of the invention, the diatomaceous earth is included in the body feed slurry at 1 to 20 percent by weight of the body feed slurry, or at 5 to 15 percent by weight of the body feed slurry, or at 8 to 13 percent by weight of the body feed slurry.

In example versions of the invention, the hop compound is included in the body feed slurry at 0.1 to 20 percent by weight of the diatomaceous earth in the body feed slurry, or at 0.1 to 10 percent by weight of the diatomaceous earth in the body feed slurry, or at 0.1 to 5 percent by weight of the diatomaceous earth in the body feed slurry, or at 0.1 to 2 percent by weight of the diatomaceous earth in the body feed slurry, or at 0.1 to 1 percent by weight of the diatomaceous earth in the body feed slurry.

The body feed slurry preferably includes another acid other than the hop compound. Non-limiting examples of the acid include phosphoric acid, sulfuric acid, hydrochloric acid, nitric acid, tartaric acid, lactic acid, tannic acid, acetic acid, oxalic acid, citric acid, and mixtures thereof. In example versions of the invention, the acid other than the hop compound is included in the body feed slurry at 0.1 to 20 percent by weight of the diatomaceous earth in the body feed slurry, or at 0.5 to 15 percent by weight of the diatomaceous earth in the body feed slurry, or at 1 to 10 percent by weight of the diatomaceous earth in the body feed slurry.

In example versions of the invention, the body feed slurry is added to the beverage being filtered at 0.1 to 5 percent by volume of the beverage being filtered, or at 0.5 to 2 percent by volume of the beverage being filtered, or at 0.75 to 1.25 percent by volume of the beverage being filtered.

By filtering a malt beverage using the filtering system and method according to the invention described above, the flavor stability of the malt beverage is increased. Among other things, the reduction of beer soluble metal ions, such as copper and iron, in the diatomaceous earth filter aid prolongs the shelf life and improves the flavor stability of the malt beverage.

It is also possible to first contact the diatomaceous earth with a hop acid and/or an acid other than the hop compound, and thereafter add the treated diatomaceous earth to the precoat slurry or body feed slurry. This version of the invention provides a method for reducing the amount of beverage soluble metal ions in a diatomaceous earth filter aid. The diatomaceous earth filter aid is contacted with a hop compound selected from iso-alpha-acids, dihydroiso-alpha-acids, tetrahydroiso-alpha-acids, hexahydroiso-alpha-acids, alpha-acids, and beta-acids. The diatomaceous earth filter aid can also be contacted with an acid other than the hop compound. Non-limiting examples of the acid include phosphoric acid, sulfuric acid, hydrochloric acid, nitric acid, tartaric acid, lactic acid, tannic acid, acetic acid, oxalic acid, citric acid, and mixtures thereof. Preferably, the acid other than the hop compound contacts the diatomaceous earth before or simultaneously with the hop compound. The diatomaceous earth filter aid can be dispersed in a slurry before being contacted with the hop compound and/or the acid other than the hop compound.

The diatomaceous earth can be contacted with the hop acid at a concentration of 0.1 to 20 percent by weight of the diatomaceous earth, or at 0.1 to 10 percent by weight of the diatomaceous earth, or at 0.1 to 5 percent by weight of the diatomaceous earth, or at 0.1 to 2 percent by weight of the diatomaceous earth, or at 0.1 to 1 percent by weight of the diatomaceous earth. The diatomaceous earth can be contacted with the acid other than the hop compound at a concentration of 0.1 to 20 percent by weight of the diatomaceous earth, or at 0.5 to 15 percent by weight of the diatomaceous earth, or at 1 to 10 percent by weight of the diatomaceous earth.

By filtering a malt beverage using diatomaceous earth treated with a hop acid and/or an acid other than the hop compound according to the invention described above, the flavor stability of the malt beverage is increased. Among other things, the reduction of beer soluble metal ions, such as copper and iron, in the diatomaceous earth filter aid prolongs the shelf life and improves the flavor stability of the malt beverage.

The invention is further illustrated in the following Examples which are presented for purposes of illustration and not of limitation.

EXAMPLES

A. Development Of Tetrahydroiso-alpha-Acids (THISO)/$H_3PO_4$ Chelating Cu/Fe on Diatomaceous Earth A laboratory diatomaceous earth filtration was established in which two diatomaceous earth slurries for precoat and body feed were combined in one operation. Prior to beer filtration, a diatomaceous earth bed on the filter paper was prepared by pouring a premixed slurry (pre-mixed for 30 minutes) containing 0.2 grams coarse diatomaceous earth powders, 0.2 grams fine diatomaceous earth powders, and 15 milliliters diluent onto a Buchner funnel attached to a suction flask. Subsequently, 100 milliliters of stock beer was filtered through the diatomaceous earth bed by vacuum suction into the flask and mixed with the previous filtrate.

Because oxidative degradation has been found to be one cause of stale flavors in beer, analytical chemical methods have been developed to evaluate the flavor stability of beer by evaluating the oxidation resistance of beer. For instance, U.S. Pat. No. 5,811,305 describes an analytical method for evaluating flavor stability of a fermented alcoholic beverage using electron spin resonance (ESR). By investigating the formation behavior of active oxygen (or free radicals) at the start of oxidative deterioration, it is possible to accurately evaluate and predict the flavor stability of a fermented alcoholic beverage at the time it becomes a finished product. Therefore, by determining "ESR Lag Time", the method known to one of skill in the art used to test for antioxidative effects in beer. Lag Time values are partially correlated with shelf life. Higher Lag Time values indicate a longer shelf life (i.e., improved flavor stability) of the beer. Or, by measuring ESR free radical intensity during an accelerated auto-oxidation of beer for 150 minutes (called T150). The increase in T150 value of a diatomaceous earth filtered beer compared to a non-filtered original stock (baseline) beer corresponds to the negative effect of diatomaceous earth on beer. In other words, the lower the T150, the more flavor stable the beverage is.

To evaluate the diatomaceous earth treatment, hop compounds [iso-alpha-acids, tetrahydroiso-alpha-acids (THISO), humulone (alpha-acid), or colupulone (beta-acid)] and diatomaceous earth was dispersed in either KOH solution or distilled water prior to filtration. Iso-alpha-acids include cis and trans-isomers of iso-humulone, iso-cohumulone, and iso-adhumulone. Dihydroiso-alpha-acids include cis and trans-isomers of dihydroiso-humulone, dihydroiso-cohumulone, and dihydroiso-adhumulone. Tetrahydroiso-alpha-acids include cis and trans-isomers of tetrahydroiso-humulone, tetrahydroiso-cohumulone, and tetrahydroiso-adhumulone. Hexahydroiso-alpha-acids include cis and trans-isomers of hexahydroiso-humulone, hexahydroiso-cohumulone, and hexahydroiso-adhumulone. The alpha-acids include cohumulone, humulone, adhumulone, and the beta-acids include colupulone, lupulone, and adlupulone. An ageing unhopped stock beer was filtered through each hop acid treated diatomaceous earth and the filtered beer was analyzed for T150 value. The beer filtered with diatomaceous earth treated by iso-alpha-acids or tetrahydro-iso-alpha-acids in distilled water indeed showed lower T150 value than beer filtered with untreated diatomaceous earth. Tetrahydroiso-alpha-acids (THISO) were selected for further investigation because it is inert to light, flavor stable, readily available, and provides foam enhancement and universal bitterness for beer.

1. Diatomaceous Earth Treated with Various Concentrations of 5% THISO

To determine the relationship between the concentration of THISO and ESR T150 value, a stock beer (pH 3.4) was filtered with diatomaceous earth treated with 0.125 milliliters, 0.25 milliliters, and 0.5 milliliters of 5% THISO, respectively. Table 1 demonstrates the positive effect of increased concentrations of THISO in treated diatomaceous earth (DE) as compared to T150 value of beer filtered with untreated diatomaceous earth and beer that was not filtered (baseline) [i.e. %T150 increase=(T150$_{diatomaceous\ earth}$−T150$_{Baseline}$)/T150$_{Baseline}$*100%]. Filtration with untreated diatomaceous earth (T150=31,324) causes a 100% or twofold T150 (65,118) increase. The addition of 0.5 milliliters of THISO to diatomaceous earth reduces the T150 increase to the lowest value of 6.9%. T150 value tends to decrease as THISO concentration increases. At a concentration of 0.5 milliliters THISO, T150 value reaches an "Isoradical" or "IsoT150" point (inherited, endogenous, or base radical intensity) where the increase in T150 value is nearly zero. In other words, there is no active radical contribution by the diatomaceous earth to the beer. The THISO treated diatomaceous earth performed as well or better than Divergan® HM polymer for heavy metal reduction.

TABLE 1

T150 Values of DE-Filtered Stock Beers

| DE Filtration | ESR T150 | % T150 Increase |
|---|---|---|
| NO DE filtered stock beer | 31,324 | baseline |
| Untreated Normal DE | 65,118 | 100 |
| 0.125 mL of 5% THISO | 48,667 | 55 |
| 0.25 ml of 5% THISO | 39,849 | 27 |
| 0.5 mL of 5% THISO | 33,473 | 6.9 |
| Divergan HM + H$_3$PO$_4$ | 38,639 | 23 |

2. Diatomaceous Earth Treated with Both 5% THISO and H$_3$PO$_4$

In Table 2, ESR confirms that T150 value of beer filtered with phosphoric acid treated diatomaceous earth increases five-fold, and has the shortest lag time compared to the baseline beer. The relationship between T150 value and the concentration of THISO in acid treated diatomaceous earth was explored. Table 2 shows T150 values of beer filtered with THISO and phosphoric acid treated diatomaceous earth do not dramatically increase compared to no DE treated stock beer (baseline) when the volume of THISO added is between 0.2-0.5 milliliters. HPLC indicates a low level (1.3 ppm) of THISO is infused to the finished products, which might be compensated by using less hops or for foam quality improvement. Any issues of cloudiness and over-foaming are diminished.

TABLE 2

Preliminary Results of T150 and HPLC for Stock Beers

| DE Treatment | ESR T150 | Lag Time (min) | Hydrohop in beer (ppm) |
|---|---|---|---|
| NO DE | 33,273 | 85 | 0.11 |
| H$_3$PO$_4$ + NO DE | 41,092 | 85 | |
| Untreated DE | 65,779 | 76 | |
| H$_3$PO$_4$ treated DE | 169,279 | 38 | 0.16 |
| 0.1 mL THISO + H$_3$PO$_4$ | 41,128 | 85 | 1.3 |
| 0.2 mL THISO + H$_3$PO$_4$ | 36,527 | 85 | |
| 0.5 mL THISO + H$_3$PO$_4$ | 30,083 | 89 | 1.3 |

One of the major contributors for T150 value increase in beer is the soluble Cu/Fe found in diatomaceous earth used in the brewing process. To correlate trace Cu/Fe with T150 value, atomic absorption (AA) was used for analysis of trace Cu/Fe in three different filtered beers: untreated diatomaceous earth, H$_3$PO$_4$ treated diatomaceous earth, and THISO/H$_3$PO$_4$ treated diatomaceous earth. This data (Table 3) provides valuable insight into the fundamental relationship between trace Cu/Fe and T150 value. Table 3 demonstrates that T150 value increase is directly correlated to soluble Cu/Fe concentrations. The highest T150 value corresponds to the greatest Cu/Fe concentration, which is found in H$_3$PO$_4$ treated diatomaceous earth filtered beer. Likewise, the lowest T150 value corresponds to the lowest Cu/Fe concentration, which is found in THISO/H$_3$PO$_4$ treated DE filtered beer. This suggests that the decrease in T150 value of filtered beer can be attributed to binding the Cu/Fe with THISO in the diatomaceous earth matrix.

TABLE 3

AA for DE Filtered Beers

| DE Treatment | Cu (mg/L) | Fe (mg/L) | ESR T150 |
|---|---|---|---|
| Untreated DE | 0.009 | 0.050 | 65,770 |
| H$_3$PO$_4$ | 0.033 | 3.500 | 169,279 |
| 0.1 mL THISO + H$_3$PO$_4$ | 0.008 | 0.036 | 41,128 |

3. Investigation of THISO and H$_3$PO$_4$

A great synergy effect between H$_3$PO$_4$ and THISO retains Cu/Fe on the diatomaceous earth. To minimize the T150 value of diatomaceous earth filtered beer, THISO and H$_3$PO$_4$ concentrations for diatomaceous earth treatment were evaluated. T150 value of beer filtered by diatomaceous earth in the function of either THISO or H$_3$PO$_4$ is summarized in Tables 4A, 4B and 5. Under constant H$_3$PO$_4$, THISO concentrations between 0.5 milliliters and 0.05 milliliters reduce T150 value increase from 0% to 50%.

TABLE 4A

Evaluation of THISO Concentration (constant H$_3$PO$_4$)

| DE Treatment | ESR T150 | % T150 Increase |
|---|---|---|
| NO DE (Original Stock) + H$_3$PO$_4$ | 33,331 | baseline |
| Untreated DE | 82,339 | 147 |
| 0.5 mL THISO + H$_3$PO$_4$ | 31,429 | 0 |
| 0.2 mL THISO + H$_3$PO$_4$ | 37,138 | 11 |
| 0.1 mL THISO + H$_3$PO$_4$ | 46,797 | 50 |
| 0.08 mL THISO + H$_3$PO$_4$ | 49,407 | 48 |
| 0.06 mL THISO + H$_3$PO$_4$ | 44,523 | 34 |
| 0.0525 mL THISO + H$_3$PO$_4$ | 49,821 | 49 |
| 0.045 mL THISO + H$_3$PO$_4$ | 60,351 | 81 |
| 0.0375 mL THISO + H$_3$PO$_4$ | 64,040 | 92 |
| 0.03 mL THISO + H$_3$PO$_4$ | 93,132 | 179 |
| 0.01 mL THISO + H$_3$PO$_4$ | 160,508 | 382 |

TABLE 4B

Evaluation of THISO (constant $H_3PO_4$)

| DE Treatment | ESR T150 | % T150 Increase |
|---|---|---|
| Original Stock + $H_3PO_4$ | 33,331 | baseline |
| Untreated DE + $H_3PO_4$ | 175,398 | 426 |
| 0.1 mL THISO + $H_3PO_4$ | 38,054 | 14 |
| 0.085 mL THISO + $H_3PO_4$ | 32,883 | 0 |
| 0.075 mL THISO + $H_3PO_4$ | 43,311 | 30 |
| 0.05 mL THISO + $H_3PO_4$ | 49,625 | 49 |
| 0.025 mL THISO + $H_3PO_4$ | 114,366 | 243 |
| 0.01 mL THISO + $H_3PO_4$ | 145,003 | 335 |

Under a constant THISO concentration, varying amounts of 2N $H_3PO_4$ added from 0.3 milliliters to 0.55 milliliters, shows no significant effect on T150 value (see Table 5). There is no significant difference between 2N sulfuric acid and 2N phosphoric acid. Under acidic conditions, however, it is still found a small amount (1.3-2.1 ppm) of THISO infused in the filtered beer by HPLC analysis.

TABLE 5

Evaluation of 2N $H_3PO_4$ with 0.05 mL of 5% THISO

| DE Treatment | ESR/PBN T150 | % T150 Increase | THISO in beer (ppm) |
|---|---|---|---|
| NO DE Control | 32,372 | baseline | 0.11 |
| Untreated DE | 83,208 | 157 | |
| 0.3 mL 2N $H_3PO_4$ | 50,189 | 55 | 1.67 |
| 0.35 mL 2N $H_3PO_4$ | 52,137 | 61 | 1.48 |
| 0.40 ml 2N $H_3PO_4$ | 47,423 | 46 | 1.77 |
| 0.45 ml 2N $H_3PO_4$ | 56,774 | 75 | 2.20 |
| 0.50 mL 2N $H_3PO_4$ | 49,121 | 52 | 2.21 |
| 0.55 ml 2N $H_3PO_4$ | 50,606 | 56 | 1.96 |

In summary, we adopted a formula of dispersing 0.4 g of diatomaceous earth (combination of pre-coat and body feed) with 0.05 milliliters (about 0.05 grams) of 5% THISO and 0.4 mL of 2N $H_3PO_4$ in 15 milliliters diluent per 100 milliliters of stock beer. At a concentration of 0.05 milliliters THISO, the formula can suppress at least 50% of the T150 increase value.

4. Capacity Evaluation of THISO/$H_3PO_4$ Treated Diatomaceous Earth

In order to reduce the cost of THISO, the filterability of both treated diatomaceous earth (special) and untreated diatomaceous earth (control) was maximized by three repetitions, i.e. three consecutive volumes of stock beer (3×100 milliliters) were filtered. Each filtered beer was analyzed for T150 value and FTU (Forced Turbidity Unit) for clarity. FIG. 1 demonstrates that T150 values are unchanged after being repeated uses of the diatomaceous earth, regardless of treated or untreated diatomaceous earth. On the other hand, no more Cu/Fe in diatomaceous earth are soluble in beer after first filtration. However, Table 6 indicates that both diatomaceous earth become less efficient, with both beers becoming less clear after 3rd filtration. Therefore, the treated diatomaceous earth could filter more volumes of beer with sustaining T150 value and less cost.

TABLE 6

Beer Clarity (FTU) of Consecutive Primary Filtration

| | Untreated DE | Treated DE |
|---|---|---|
| 1st primary filtration | 236 | 256 |
| 2nd primary filtration | 248 | 253 |
| 3rd primary filtration | 307 | 320 |

B. Validation of THISO/$H_3PO_4$ Treated Diatomaceous Earth

To test the effectiveness of treated diatomaceous earth, a scale-up trial was conducted. The above formula was validated and beer samples at each stage were measured for ESR T150 value and soluble Cu/Fe. An EOF (end of fermentation) unhopped stock (10 bbl) was divided into two equal portions. Each portion (5 bbl) was followed the same primary filtration, aging, final filtration, and packaging. The control used untreated DE and the special used THISO/$H_3PO_4$ treated diatomaceous earth. Results of atomic absorption/inductively coupled plasma (AA/ICP) spectrometries for trace Cu/Fe are summarized in Table 7 and plotted in FIGS. 2A and 2B.

TABLE 7

Trace Metals Analyses of Processed and Finished Beer

| | DE Filtration | Cu (µg/L) AA/ICP | Fe (µg/L) AA/ICP | BU | SO2 (mg/L) |
|---|---|---|---|---|---|
| Feed Stock | none | 39/40.1 | 0.0/64.1 | | |
| 1° Control | 1° w/untreated DE | 45/39.6 | 31/82.1 | | |
| 1° Special | 1°w/ treated DE | 40/38.8 | 0.0/76.7 | | |
| Aging Control | | 39/42.2 | 28/105 | | |
| Aging Special | | 37/38.0 | 0.0/91.4 | | |
| Package released Control | Final w/untreated DE | 32/32.8 | 22/96.1 | | |
| Package released Special | Final w/ treated DE | 47/34.6 | 0.0/57.9 | | |
| Packaged Control | | 29/37.1 | 25/92.0 | 7.40 | 3.0 |
| Packaged Special | | 43/26.3 | 12/73.6 | 9.8 | 3.0 |

FIGS. 2A and B depict distributions of trace Cu/Fe (ppb) vs. various stages of beer samples by AA and ICP, respectively. Both AA and ICP indicate that Cu seems less impact and steady over all stages. However, ICP shows higher sensitivity to Fe than AA. Compared to feed stock, ICP detects Fe increase in both control and special after primary filtration, aging, and packaging, but indicates only an increase in the control after final filtration. No increase is seen in the special. The DE treatment does not seem to affect Fe in primary filtration, but shows effectiveness in final filtration (FIG. 2B). We observe that the less sensitive AA seems able to measure only net Fe increase, while ICP measures total Fe concentrations more accurately in all beers. It is noted that Fe increases during aging and packaging processes. These increases do not correlate to DE usage and might be due to deviations of the equipment or process.

Analyses of samples for T150 value and lag time are plotted in FIGS. 3 and 4 for a trial (labeled MVB). Clearly, the T150 value and lag times of all processed specials are comparable to the original stock at a net zero T150 value gain, reaching an "Isoradical" or "IsoT150" point. In contrast, all the respective controls show higher T150 value and shorter lag times. The correlation between T150 value and Cu/Fe is clearly shown.

Finally, a plot of trace Cu and Fe contents against T150 values of the control beer (FIG. 5) shows a relationship between T150 value and Fe, but not Cu. Fe appears to have a greater impact than Cu on the free radical formation (T150 value). The MVB trial shows that the THISO/$H_3PO_4$ formula is effective in preventing soluble Fe in diatomaceous earth from being passed into beer.

C. Sensory Oxidation Evaluation of Trial

Correlation between T150 values and sensory evaluation was established as follows. A study was undertaken to assess the impact of THISO treatment of diatomaceous earth slurry on the flavor stability of trial beer. Two samples were evaluated: C1 was a control brewed beer; and S1 was special beer filtered with THISO and phosphoric acid treated diatomaceous earth.

Samples were stored at 85° F. and 32° F. for 4, 8 and 12 weeks. At each test period, each 85° F. S1 special was evaluated against the 85° F. C1 control sample for oxidation. In addition, each 85° F. S1 and C1 sample was evaluated against a corresponding 32° F. S1 and C1 sample to obtain absolute oxidation scores. Mean scores are based on a 24-point linear scale where 1<weak and 24>strong.

The results are shown in Tables 8, 9, 10 and 11.

TABLE 8

SO$_2$ AND ESR RESULTS

| Sample | SO$_2$(ppm) | ESR Lagtime | ESR T150 |
|---|---|---|---|
| C1 | 3.0 | 64 | 79528 |
| S1 | 3.0 | 76 | 63741 |

TABLE 9

85° F. C1 VS. 85° F. S1

| Week | Sample | Mean |
|---|---|---|
| 4 | C1 | 4.5 |
|   | S1 | 5.1 |
| 8 | C1 | 7.4 |
|   | S1 | 5.7 |
| 12 | C1 | 7.8 |
|   | S1 | 5.5 |

TABLE 10

Sample C1: 32° F. vs. 85° F.

| Week | Sample | Mean |
|---|---|---|
| 4 | 32° F. | 4.6 |
|   | 85° F. | 6.5 |
| 8 | 32° F. | 4.4 |
|   | 85° F. | 8.4 |
| 12 | 32° F. | 4.5 |
|   | 85° F. | 9.5 |

TABLE 11

Sample S1: 32° F. vs. 85° F.

| Week | Sample | Mean |
|---|---|---|
| 4 | 32° F. | 4.4 |
|   | 85° F. | 6.1 |

TABLE 11-continued

Sample S1: 32° F. vs. 85° F.

| Week | Sample | Mean |
|---|---|---|
| 8 | 32° F. | 4.4 |
|   | 85° F. | 7.6 |
| 12 | 32° F. | 4.6 |
|   | 85° F. | 8.6 |

Thus, the beer special filtered with THISO and phosphoric acid treated diatomaceous earth developed significantly less oxidation than the control at week 8 and 12 when stored at 85° F. ESR analysis also showed improved flavor stability with the special filtered with THISO and phosphoric acid treated diatomaceous earth compared to the control.

CONCLUSION

Diatomaceous earth contains significant copper and iron in various forms, of which one or more may be soluble in the beer being filtered and has a deleterious effect on the flavor stability or shelf-life of beer. Reduction of beer soluble copper and iron in diatomaceous earth can prolong the shelf life and/or improve flavor stability. We discovered that iso-alpha-acids and tetrahydroiso-alpha-acids bind the copper and iron metal ions and/or changes the form of copper and iron in diatomaceous earth so copper and iron are rendered substantially insoluble in beer. Using both $H_3PO_4$ and tetrahydroiso-alpha-acids, the $H_3PO_4$ facilitates releasing and chelating copper and iron with tetrahydroiso-alpha-acids and confines them on the diatomaceous earth matrix leading to improved flavor stability and/or longer shelf-life of beer.

Without intending to be bound by theory, we believe the tri-keto functional group on the structures of hop principal bittering compounds (iso-alpha-acids, dihydroiso-alpha-acids, tetrahydroiso-alpha-acids, hexahydroiso-alpha-acids, alpha-acids, or beta-acids) chelates various metal ions such as $Mg^{++}$, $Ca^{++}$, $Fe^{++}$, $Fe^{+++}$, $Co^{++}$, $Ni^{++}$, $K^+$, $Cu^+$ or $Na^+$. These functional groups are thought to be a possible binding site for the copper and iron ions in diatomaceous earth. The Examples demonstrate a novel approach of releasing and binding copper and iron metal ions on diatomaceous earth facilitated by hop bittering compounds and $H_3PO_4$. The Examples demonstrate the outcome of tetrahydroiso-alpha-acids and $H_3PO_4$ treatment for suppression of ESR T150 value with PBN (phenyl-tert-butyl nitrone, a spin trap for free radicals) and reduction of trace Cu/Fe by Atomic Absorption (AA)/Inductive Couple Plasma (ICP) in beer.

Under an acidic condition using phosphoric acid, tetrahydroiso-alpha-acid gives a stronger binding effect and retention of copper and iron on diatomaceous earth versus lower pHs. It prevents copper and iron from being transferred into beer during filtration. We believe that the phosphoric acid facilitates the releasing of copper and iron ions to interact with tetrahydroiso-alpha-acids on the diatomaceous earth matrix. As a result, there is no increase in free radical formation (expressed by ESR/PBN T150 value and lag time) or copper and iron ion concentration in beer after diatomaceous earth filtration. It is consistent with a lower sensory perception of oxidation, which leads to improved flavor stability or longer shelf-life of beer.

Thus, the present invention provides a method for improving the flavor stability of a fermented malt beverage. The method reduces or eliminates stale off-flavors that develop during extended storage of fermented malt beverages, such as beer and ale. It is believed that the stale flavor that occurs in stale beer arises from the free radical mediated oxidation of various constituents in beer. The characteristic odor and taste are believed to be caused by decomposition products from the free radical process. The present invention reduces the amount and/or the formation of free radicals in the finished fermented malt beverage product by confining the copper and iron on the diatomaceous earth matrix. Specifically, there is no or less increase in copper and iron ions after both primary and final filtration, leading to improved flavor stability and/or longer shelf-life of beer.

Although the invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A method for reducing the amount of beverage soluble metal ions in a diatomaceous earth filter aid, the method comprising:
    contacting the diatomaceous earth filter aid with a hop compound selected from iso-alpha-acids, dihydroiso-alpha-acids, tetrahydroiso-alpha-acids, hexahydroiso-alpha-acids, alpha-acids, and beta-acids,
    wherein the beverage soluble metal ions are selected from copper, iron and mixtures thereof, and
    wherein the diatomaceous earth filter aid is dispersed in a slurry, and the hop compound is added to the slurry at 0.1 to 20 percent by weight of the diatomaceous earth in the slurry,
    whereby the beverage soluble metal ions are confined on a matrix of the diatomaceous earth filter aid.

2. The method of claim 1 wherein:
the slurry includes an acid other than the hop compound.

3. The method of claim 2 wherein:
the acid is selected from the group consisting of phosphoric acid, sulfuric acid, hydrochloric acid, nitric acid, tartaric acid, lactic acid, tannic acid, acetic acid, oxalic acid, citric acid, and mixtures thereof.

4. The method of claim 2 wherein:
the hop compound is selected from tetrahydroiso-alpha-acids, and
the acid is phosphoric acid.

5. The method of claim 4 wherein:
the slurry includes the hop compound at 0.1 to 20 percent by weight of the diatomaceous earth in the slurry.

6. The method of claim 5 wherein:
the slurry includes the phosphoric acid at 0.1 to 20 percent by weight of the diatomaceous earth in the slurry.

7. The method of claim 1 wherein:
the slurry includes the diatomaceous earth at 1 to 20 percent by weight of the slurry.

8. A method for filtering a beverage, the method comprising:
    contacting a filter element with a precoat slurry including diatomaceous earth and a hop compound selected from iso-alpha-acids, dihydroiso-alpha-acids, tetrahydroiso-alpha-acids, hexahydroiso-alpha-acids, alpha-acids, and beta-acids thereby depositing a layer of diatomaceous earth on the filter element; and
    passing the beverage through the layer of diatomaceous earth on the filter element,
    wherein beverage soluble metal ions selected from copper, iron and mixtures thereof are removed from the beverage, and
    wherein the hop compound is included in the precoat slurry at 0.1 to 20 percent by weight of the diatomaceous earth in the precoat slurry,
    whereby the beverage soluble metal ions are confined on a matrix of the diatomaceous earth filter aid.

9. The method of claim 8 wherein:
the precoat slurry includes an acid other than the hop compound.

10. The method of claim 9 wherein:
the acid is selected from the group consisting of phosphoric acid, sulfuric acid, hydrochloric acid, nitric acid, tartaric acid, lactic acid, tannic acid, acetic acid, oxalic acid, citric acid, and mixtures thereof.

11. The method of claim 9 wherein:
the hop compound is selected from tetrahydroiso-alpha-acids, and
the acid is phosphoric acid.

12. The method of claim 11 wherein:
the precoat slurry includes the hop compound at 0.1 to 20 percent by weight of the diatomaceous earth in the precoat slurry, and
the precoat slurry includes the phosphoric acid at 0.1 to 20 percent by weight of the diatomaceous earth in the precoat slurry.

13. The method of claim 12 wherein:
the precoat slurry includes the diatomaceous earth at 1 to 20 percent by weight of the precoat slurry.

14. The method of claim 8 further comprising:
adding a second slurry to the beverage before passing the beverage through the layer of diatomaceous earth on the filter element wherein the second slurry includes diatomaceous earth and a hop compound selected from iso-alpha-acids, dihydroiso-alpha-acids, tetrahydroiso-alpha-acids, hexahydroiso-alpha-acids, alpha-acids, and beta-acids.

15. The method of claim 14 wherein:
the diatomaceous earth in the precoat slurry has a first average particle size, and
the diatomaceous earth in the second slurry has a second average particle size smaller than the first average particle size.

16. The method of claim 14 wherein:
the hop compound is included in the second slurry at 0.1 to 10 percent by weight of the diatomaceous earth in the second slurry.

17. The method of claim 8 wherein:
the beverage is a malt beverage.

18. A method for increasing the flavor stability of a malt beverage wherein the malt beverage is filtered with a diatomaceous earth filter aid, the method comprising:
    contacting the diatomaceous earth filter aid with a hop compound selected from iso-alpha-acids, dihydroiso-alpha-acids, tetrahydroiso-alpha-acids, hexahydroiso-alpha-acids, alpha-acids, and beta-acids thereby preventing release of at least some beverage soluble metal ions into the beverage,
    wherein the beverage soluble metal ions are selected from copper, iron and mixtures thereof, and
    wherein the diatomaceous earth filter aid is contacted with the hop compound in a slurry of the diatomaceous earth filter aid, and
    wherein the slurry includes the hop compound at 0.1 to 20 percent by weight of the diatomaceous earth in the slurry,
    whereby the beverage soluble metal ions are confined on a matrix of the diatomaceous earth filter aid.

19. The method of claim 18 wherein:
the diatomaceous earth filter aid is contacted with the hop compound and an acid other than the hop compound in a slurry of the diatomaceous earth filter aid.

20. The method of claim 19 wherein:
the hop compound is selected from tetrahydroiso-alpha-acids, and
the acid is phosphoric acid.

21. The method of claim 20 wherein:
the slurry includes the phosphoric acid at 0.1 to 20 percent by weight of the diatomaceous earth in the slurry.

22. The method of claim 14 wherein:
the second slurry is added to the beverage at 0.1 to 5 percent by volume of the beverage.

* * * * *